US008140535B2

(12) United States Patent
Eggebraaten et al.

(10) Patent No.: US 8,140,535 B2
(45) Date of Patent: Mar. 20, 2012

(54) ONTOLOGY-BASED NETWORK SEARCH ENGINE

(75) Inventors: Thomas John Eggebraaten, Rochester, MN (US); Jeffrey Wayne Tenner, Rochester, MN (US); Shannon Everett Wenzel, Colby, WI (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 11/876,989

(22) Filed: Oct. 23, 2007

(65) Prior Publication Data
US 2009/0106217 A1     Apr. 23, 2009

(51) Int. Cl.
G06F 7/00 (2006.01)
G06F 17/00 (2006.01)
(52) U.S. Cl. ......... 707/741; 707/706; 707/715; 707/736
(58) Field of Classification Search .................. 707/3, 5, 707/706, 715, 736, 741
See application file for complete search history.

(56) References Cited

U.S. PATENT DOCUMENTS

| | | | |
|---|---|---|---|
| 5,754,938 A | 5/1998 | Herz et al. | |
| 6,038,560 A | 3/2000 | Wical | |
| 6,424,973 B1 | 7/2002 | Baclawski | |
| 6,460,036 B1 | 10/2002 | Herz | |
| 6,480,835 B1 | 11/2002 | Light | |
| 6,665,656 B1 | 12/2003 | Carter | |
| 6,675,159 B1 | 1/2004 | Lin et al. | |
| 2002/0052894 A1 | 5/2002 | Bourdoncle et al. | |
| 2002/0073115 A1* | 6/2002 | Davis | 707/500.1 |
| 2002/0129015 A1 | 9/2002 | Caudill et al. | |
| 2003/0037041 A1 | 2/2003 | Hertz | |
| 2003/0177112 A1 | 9/2003 | Gardner | |
| 2004/0068514 A1 | 4/2004 | Chundi et al. | |
| 2004/0103090 A1* | 5/2004 | Dogl et al. | 707/3 |
| 2005/0086216 A1* | 4/2005 | Davis | 707/3 |
| 2005/0203924 A1 | 9/2005 | Rosenberg | |
| 2005/0216443 A1 | 9/2005 | Morton et al. | |
| 2006/0036633 A1 | 2/2006 | Chong et al. | |
| 2006/0053099 A1 | 3/2006 | Gardner et al. | |
| 2006/0053151 A1 | 3/2006 | Gardner et al. | |

(Continued)

OTHER PUBLICATIONS

U.S. Patent Application entitled, "Ontology-Based Network Search Engine,"ROC920070492US1, filed Oct. 25, 2007, U.S. Appl. No 11/923,922.

(Continued)

*Primary Examiner* — Apu Mofiz
*Assistant Examiner* — Jared Bibbee
(74) *Attorney, Agent, or Firm* — Patterson & Sheridan LLP

(57) ABSTRACT

A method and apparatus for searching for a documents residing on a network comprises receiving a search request from a user. The search request comprises one or more search terms of an ontology. The ontology includes a plurality of terms. One or more of the plurality of terms includes a plurality of sub-category terms. One or more documents residing on the network is identified based on the one or more search terms and an ontology index. The ontology index comprises a plurality of relationships between the plurality of terms and sub-category terms of the ontology and a plurality of documents residing on the network. One or more search results that describe the one or more documents is presented to the user. The one or more documents contain the one or more search terms, or one of the plurality of sub-category terms of the one or more search terms.

20 Claims, 8 Drawing Sheets

U.S. PATENT DOCUMENTS

2006/0074980 A1* 4/2006 Sarkar ..................... 707/104.1
2006/0173817 A1 8/2006 Chowdhury et al.
2006/0248458 A1 11/2006 Li
2008/0091656 A1 4/2008 Charnock et al.

OTHER PUBLICATIONS

Hassina Aliane, "An Ontology Based Approach to Multilingual Information Retrieval," IEEE Information and Communication Technologies ICTTA '06, Oct. 2006: pp. 1732-1737.

Travis D. Breaux et al., "Using Ontology in Hierarchical Information Clustering," Proceedings of the 38th Hawaii International Conference on System Sciences—2005, vol. 4(4): pp. 1-7.

Gaurav Harit et al., "Ontology Guided Access to Document Images," Proceedings of the 2005 Eight International Conference on Document Analysis and Recognition (ICDAR'05), Aug./Sep. 2005: pp. 292-296.

Latifur Khan et al., "Ontology Construction for Information Selection," Proceedings of the 14th IEEE International Conference on Tools with Artificial Intelligence (ICTAI'02), 2002: pp. 1-6.

Chang-Shing Lee et al., "A Fuzzy Ontology and Its Application to News Summarization," IEEE Transactions on Systems, Man, and Cybernetics—Part B: Cybernetics, Oct. 2005, vol. 35(5): pp. 859-880.

Sung-Shin Lim et al., "Improving Patent Retrieval System using Ontology," The 30th Annual Conference of the IEEE Industrial Electronics Society, Nov. 2004, vol. 3: pp. 2646-2649.

* cited by examiner

656

| 602 | 604 |
|---|---|
| KEYWORD | REFERENCE |
| ANXIETY | 2: 5; 10, 23<br>1: 6; 51 |
| DISORDER | 1: 4; 18<br>1: 5; 11 |
| HYPERVENTILATION | 1: 5; 24<br>1: 6: 52 |
| MENTAL | 2: 4; 17, 30<br>1: 7; 5 |
| ... | |

| 662 | 664 |
|---|---|
| TERM | REFERENCE |
| ANXIETY HYPERVENTILATION | 1: 5; 23<br>1: 6; 51 |
| ANXIETY DISORDER | 2: 5; 10, 23<br>1: 6; 51 |
| MENTAL DISORDER | 1: 4; 17<br>2: 5; 10, 23<br>1: 6; 51 |
| ... | |

FIG. 6B

ONTOLOGY-BASED NETWORK SEARCH ENGINE

BACKGROUND OF THE INVENTION

The field of the invention is related to search engines, specifically to ontology-based network search engines.

DESCRIPTION OF THE RELATED ART

Search engines work by crawling the web, analyzing the web pages found and creating an index that is used during the runtime of the searches. In most cases, an inverted index is also created that maps keywords to web pages. Typically, keyword-based searches employ stem-based approaches to widen searches to relevant documents. For example, when a user enters a keyword such as "jump," the search engine also searches for documents with keywords such as jumps, jumped, and jumping. A search engine may also allow a user to do a search based on synonyms of the specified keywords.

While this synonym searching is a powerful feature, users continue to demand improved searching capabilities.

SUMMARY OF THE INVENTION

The present invention generally provides a computer-implemented method of registering an ontology with a search engine provider. The method comprises receiving an ontology definition comprising a plurality of terms from an ontology owner. The method further comprises storing the ontology definition on a search engine server, and creating an ontology index based on the ontology definition and a keyword index. The keyword index includes a plurality of relationships between a plurality of keywords and a plurality of documents residing on a network. The ontology index includes a plurality of relationships between the plurality of terms and the plurality of documents residing on the network. The method further comprises storing the ontology index.

According to one embodiment, a computer-readable storage medium contains a program which, when executed, performs an operation. The operation comprises receiving a search request from a user, comprising one or more search terms. The one or more search terms are included in an ontology, and the ontology includes a plurality of terms. One or more of the plurality of terms includes a plurality of sub-category terms. The operation further comprises identifying one or more documents residing on the network based on the one or more search terms and an ontology index. The ontology index comprises a plurality of relationships between the plurality of terms or sub-category terms of the ontology and a plurality of documents residing on the network. The operation further comprises presenting one or more search results that describe the one or more documents to the user. The one or more documents contain the one or more search terms, or one of the plurality of sub-category terms of the one or more search terms.

According to one embodiment, a system comprises a processor and a memory. The memory contains a program configured to register an ontology with a search engine provider. The program, when executed on the processor, performs an operation. The operation comprises receiving an ontology definition comprising a plurality of terms from an ontology owner. The operation further comprises storing the ontology definition on a search engine server and creating an ontology index based on the ontology definition and a keyword index. The keyword index includes a plurality of relationships between a plurality of keywords and a plurality of documents residing on a network. The ontology index includes a plurality of relationships between the plurality of terms and the plurality of documents residing on the network. The operation further comprises storing the ontology index.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6A illustrates an example keyword index, according to one embodiment of the invention.

FIG. 6B illustrates an example ontology index, according to one embodiment of the invention.

DETAILED DESCRIPTION OF THE PREFERRED EMBODIMENTS

Figure 1:
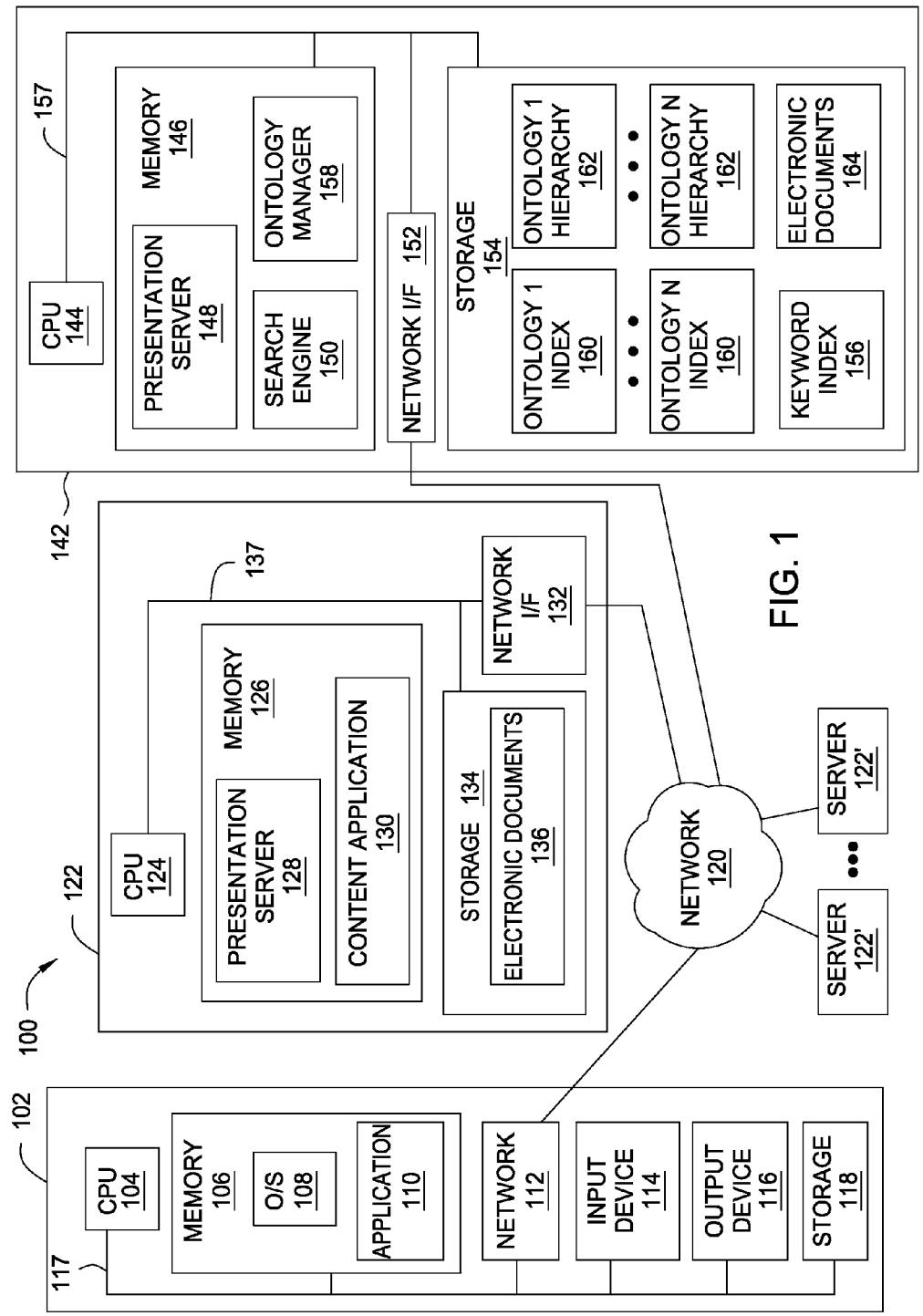
FIG. 1 is a block diagram illustrating a system for ontology-based network searching, according to one embodiment of the invention.

Embodiments of the present invention provide ontology-based searches on a network. Generally, an ontology may be a controlled vocabulary within a specific domain of interest that describes concepts and relations between concepts in a formal way. Accordingly, an ontology-based search for a concept term may locate both documents containing the concept term, and documents containing related (as defined by the ontology) concept terms, according to one embodiment. One embodiment provides a registration process, which creates an ontology index by comparing an ontology to an existing keyword index on a search engine. The hierarchical organization of the ontology provides a way to relate terms within both broader and narrower concepts. By using an ontology-based search instead of a keyword search, a user can search for a term that describes a broad concept. In response, a search engine can return to the user a list of documents on a network that includes either the concept term, or more narrow terms within the concept, as defined by the ontology.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for ontology-based network searching, according to one embodiment of the invention. In general, the networked system 100 includes a client (e.g., user's) computer 102, at least one content server 122 (four such servers 122 are shown), and a search engine server 142. The client 102, content server 122, and search engine server 142 are connected via a network 120. In general, the network 120 may be a local area network (LAN) and/or a wide area network (WAN). In a particular embodiment, the network 120 is the Internet. Servers 122 may be distinct web servers for different websites. Such websites may include e-commerce sites, news sites, or any other website with a uniform resource locator, accessible from client computer 102 over a network 120, as described herein.

The client computer 102 includes a Central Processing Unit (CPU) 104 connected via a bus 117 to a memory 106, storage 118, an input device 114, an output device 116, and a network interface (I/F) device 112. The processor 104 could be any processor used to perform an embodiment of the invention. The input device 114 can be any device to give input to the client computer 102. For example, a keyboard, keypad, light pen, touch-screen, track-ball, or speech recognition unit, audio/video player, and the like could be used. The output device 116 can be any device to give output to the user, e.g., any conventional display screen or set of speakers, along with their respective interface cards, i.e., video cards and sound cards (not shown). Although shown separately from the input device 114, the output device 116 and input device 114 could be combined. For example, a display screen with an integrated touch-screen, a display with an integrated keyboard, or a speech recognition unit combined with a text speech converter could be used.

The network interface device 112 may be any entry/exit device configured to allow network communications between the client computer 102, the content servers 122, and the search engine server 142 via the network 120. For example, the network interface device 112 may be a network adapter or other network interface card (NIC).

Storage 118 is preferably a Direct Access Storage Device (DASD). Although it is shown as a single unit, it could be a combination of fixed and/or removable storage devices, such as fixed disc drives, floppy disc drives, tape drives, removable memory cards or optical storage. The memory 106 and storage 118 could be part of one virtual address space spanning multiple primary and secondary storage devices.

The client computer 102 is generally under the control of an operating system 108, which is shown in the memory 106. Illustrative operating systems, which may be used to advantage, include Linux and Microsoft Windows. More generally, any operating system supporting the browser 110 functions disclosed herein may be used.

The memory 106 is preferably a random access memory sufficiently large to hold the necessary programming and data structures of the invention. While the memory 106 is shown as a single entity, it should be understood that the memory 106 may in fact comprise a plurality of modules, and that the memory 106 may exist at multiple levels, from high speed registers and caches to lower speed but larger DRAM chips.

Illustratively, the memory 106 includes an application 110 that, when executed on CPU 104, provides support for locating network addresses at one or more of the servers 122 and 142, and exchanging information between the client 102 and the various servers 122 and 142. In one embodiment, the application 110 is a browser that includes a web-based Graphical User Interface (GUI), which allows the user to navigate and display web-pages located on the Internet. However, more generally the application may be a thin client application configured to transfer data (e.g., HTML, XML, etc.) between the client computer 102, the servers 122, and the search engine server 142 via, for example, HTTP. By way of example only, the application 110 will be referred to herein as a browser.

Content server 122 generally comprises a CPU 124, a memory 126, a storage device 134, and a network interface device 132, coupled to one another by a bus 137. The memory 126 may be a random access memory sufficiently large to hold the necessary programming and data structures that are located on the content server 122. The programming and data structures may be accessed and executed by the CPU 124 as needed during operation. As shown, the memory 126 includes a presentation server 128 and a content application 130.

The presentation server 128 is adapted to service requests from the client computer 102, which invoke the content application 130. In turn, the content application 130 may perform various functions which include generating, accessing and/or populating electronic documents 136 (e.g., markup language documents such as HTML documents and XML documents) residing on the content server 122

As used herein, an electronic document 136 is machine-readable data, regardless of the medium of storage or transmission. In one embodiment, the documents 136 are webpages each having an associated network address. Although the documents are shown in FIG. 1 residing on the content server 122, it should be understood that the documents 136 need not be static, but instead may be generated by the content application 130.

The document 136 may then be served to a requesting browser 110 on a respective client computer 102. The browser 110 may display the document 136 to a user operating the client computer 102.

By way of illustration, the presentation server 128 may be an instance of Apache, Tomcat or IBM Web Sphere products. Web Sphere is available from International Business Machines, Inc. Further, the content application 130 may be configured to access a back end database (not shown), or perform other functions. By way of illustration, the content application 130 may be a stock quote retrieval application, an e-commerce application such as eBay, or an e-business application such as IBM Connect, or a Portal environment such as IBM Web Sphere portal server, which runs in an application environment. However, more generally, it is contemplated that the invention is adaptable to any application server and applications.

Search engine server 142 generally comprises a CPU 144, a memory 146, a storage device 154, and a network interface device 152, coupled to one another by a bus 157. The memory 146 may be a random access memory sufficiently large to hold the necessary programming and data structures that are located on the search engine server 142. The programming and data structures may be accessed and executed by the CPU 144 as needed during operation.

As shown, the memory 146 includes a presentation server 148, a search engine application 150, and an ontology manger 158. The presentation server 148 is adapted to service requests from the client computer 102 which invoke the search engine 150. In turn, the search engine 150 may perform various functions which include generating, and/or populating electronic documents 164 (e.g., markup language documents such as HTML documents and XML documents) residing on the search engine server 142. Although the documents 164 are shown in FIG. 1 residing on the server 142, it should be understood that the documents 164 need not be static, but instead may be generated by the search engine 150. Embodiments of a search engine 150, and ontology manager 158, are described in further detail in the following discussion.

Storage 154 is preferably a Direct Access Storage Device (DASD). Although it is shown as a single unit, it could be a combination of fixed and/or removable storage devices, such as fixed disc drives, floppy disc drives, tape drives, removable memory cards or optical storage. The memory 146 and storage 154 could be part of one virtual address space spanning multiple primary and secondary storage devices.

As shown, the storage 154 includes a keyword index 156, ontology indices 160 and ontology hierarchies 162. The keyword index 156 is typically a data structure created by search engine 150. Periodically, the search engine 150 'crawls' the network to access all the content servers 122, and analyzes the text within all the electronic documents 136 on those content servers 122. The search engine 150 may create a keyword index 156 that associates text, or keywords, within the documents 136 to the numerous documents 136 that contain the keyword. The keyword index 156 enables a search engine 150 to quickly respond to a user's request for documents 136 related to user-specified keyword(s).

In response to a user requesting a search based on a keyword, a search engine 150 typically returns a list within an electronic document 164, wherein each entry describes the electronic documents 136 associated with that keyword in the keyword index 156. Queries may use Boolean logic to combine keyword searches. The result of an "AND" operation is an intersection of the individual keyword components results. The result of an "OR" operation is a union of the individual keyword component results.

The ontology manager 158 may derive ontology indices 160 by comparing ontology hierarchies 162 to the keyword index 156. Ontology hierarchies 162 generally consist of a number of specific terms. Each term may also describe a category that contains other terms (also referred to herein as sub-categories). Accordingly, the phrases term and category are used interchangeably herein. A representative portion of an ontology hierarchy for "neurology" may appear as follows:

I. Mental Disorder
    a. Adjustment disorder
    b. Anxiety disorder
        i. Acute stress disorder
        ii. Anxiety disorder of childhood or adolescence When a user requests a search based on a term included in an ontology hierarchy 162, the search engine 150 returns a list, wherein each entry describes the electronic documents 136 associated with the term, and all terms within the category described by the term. In the above example, an ontology search on, "Anxiety disorder," returns a list describing all documents 136 associated with, "Anxiety disorder," "Acute stress disorder," or "Anxiety disorder of childhood or adolescence." Advantageously, in one embodiment, the creation of an ontology index 160 does not require additional network searches for documents 136 relevant to the ontology, but instead relies on the existing keyword index 156. Further, performing a keyword search using all the terms in a broad category of the ontology is resource intensive. A keyword search in such a case means a longer wait for the user to see results, and a detrimental impact on search engine 150 performance. As with keyword searches, ontology-based term searches can be combined with Boolean logic to get the union or intersection of results.

In some embodiments, the ontology manager 158 may restrict access to ontology indices 160 and hierarchies 162. To allow owners of ontologies the ability to recover costs associated with building and maintaining ontologies, an ontology manager 158 may implement security measures to limit access to users paying for access to the ontology. In such a case, some ontology owners may choose to 'publish' their ontologies, allowing unrestricted access to the ontology for the purposes of ontology-based searches.

An ontology owner may be a person, group, or organization that creates and maintains an ontology hierarchy 162. In some embodiments, ontology owners may use the ontology manager 158 to register an ontology on a search engine server 142. Registering the ontology on the search engine server 142 may include placing an ontology hierarchy 162 in storage 154, and creating a respective ontology index 160.

To register an ontology, an ontology owner may provide a search engine provider with an ontology for which to create an index 160. Creating the index 160 could be a service that the search engine provider offers to ontology owners, or just an internal setup that provider performs for common industry ontologies. In some embodiments, the ontology owner may define an ontology hierarchy 162 in a standardized format, such as an Ontology Markup Language (OML), or Ontology Web Language (OWL). A registration process may also include the selection of security options, customized to an ontology owner's preferences.

FIG. 1 is merely one hardware/software configuration for the networked client computer 102, content servers 122, and search engine servers 142. Embodiments of the present invention can apply to any comparable hardware configuration, regardless of whether the computer systems are complicated, multi-user computing apparatus, single-user workstations or network appliances that do not have non-volatile storage of their own. Further, it is understood that while reference is made to particular languages, including HTML, XML and JAVA, the invention is not limited to a particular language, standard or version. Accordingly, persons skilled in the art will recognize that the invention is adaptable to other languages and that the invention is also adaptable to future changes in a particular language as well as to other languages presently unknown. Further, the presentation server 128 and content application 130 are merely illustrative and other embodiments adapted to support any known and unknown protocols/functions are contemplated.

Figure 2:
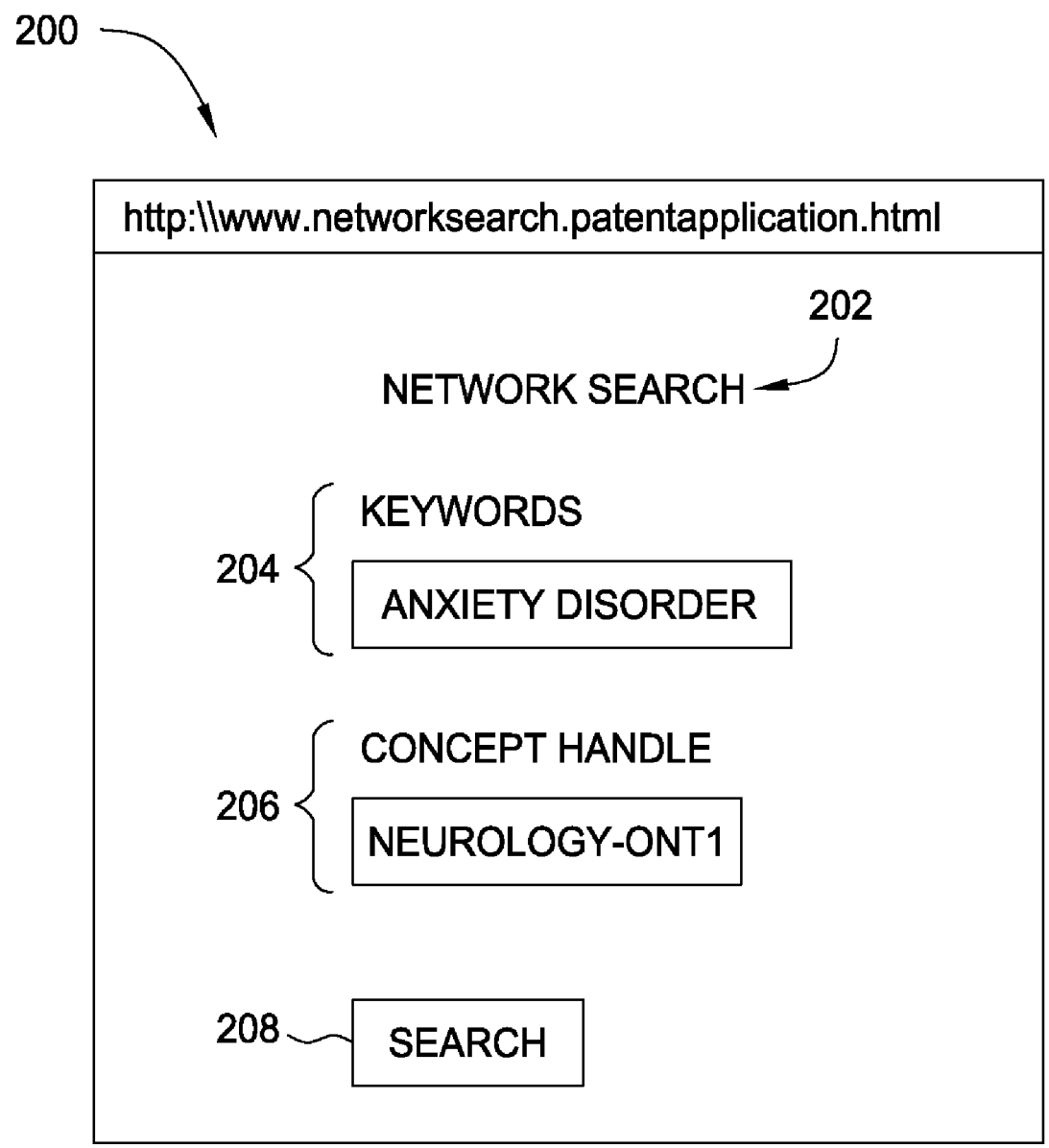
FIG. 2 is an example screen shot of a network search engine web page that uses ontology-based searches, according to one embodiment of the invention.

FIG. 2 is an example screen shot 200 of a network search engine Web page that uses ontology-based searches, according to one embodiment of the invention. Screen 200 includes title 202, keyword entry field 204, concept handle entry field 206 and search button 208.

In embodiments of the invention, the search engine 150 looks up the keywords 204 in an index, and returns a list of documents for the keywords found in the index. For strict keyword searches, the index is a keyword index 156. For ontology-based searches, the index is an ontology-index 160.

In this example, a user on a client computer 102 enters the keywords "anxiety disorder" into the keyword entry field 204. For an ontology-based search, the user enters a concept handle in the concept handle entry field 206. A concept handle identifies a specific ontology index 160 and hierarchy 162. In one embodiment of the invention, ontology owners may limit access to an ontology, by restricting the availability of a concept handle to a specific group, such as employees, registered members of an industry group, etc. Ontology owners that wish to publish their ontologies may make their respective concept handles public on Web pages, industry journals, and the like.

In some embodiments, the search engine web page 200 may include a drop-down list of all public ontologies. Advantageously, providing a drop-down list of public ontologies enables a user to perform ontology-based searches without having to find the concept handle for a particular ontology. Additionally, a user that is not looking for a particular ontology may discover ontologies of interest by perusing a drop-down list of public ontologies.

In this example, a user enters a concept handle "NEUROLOGY-ONT1," in the concept handle entry field 206. To proceed with the ontology search, the user may press the search button 208. Because this is an ontology-based search, the ontology manager 158 presents the user with the appropriate section of the "NEUROLOGY-ONT1 hierarchy 162" for the keywords, "ANXIETY DISORDER," shown in FIG. 3.

According to one embodiment, a user may enter a concept handle without a keyword entry. In such a case, the search engine 150 may return a default section of the respective ontology hierarchy 162, defined by the ontology owner.

Figure 3:
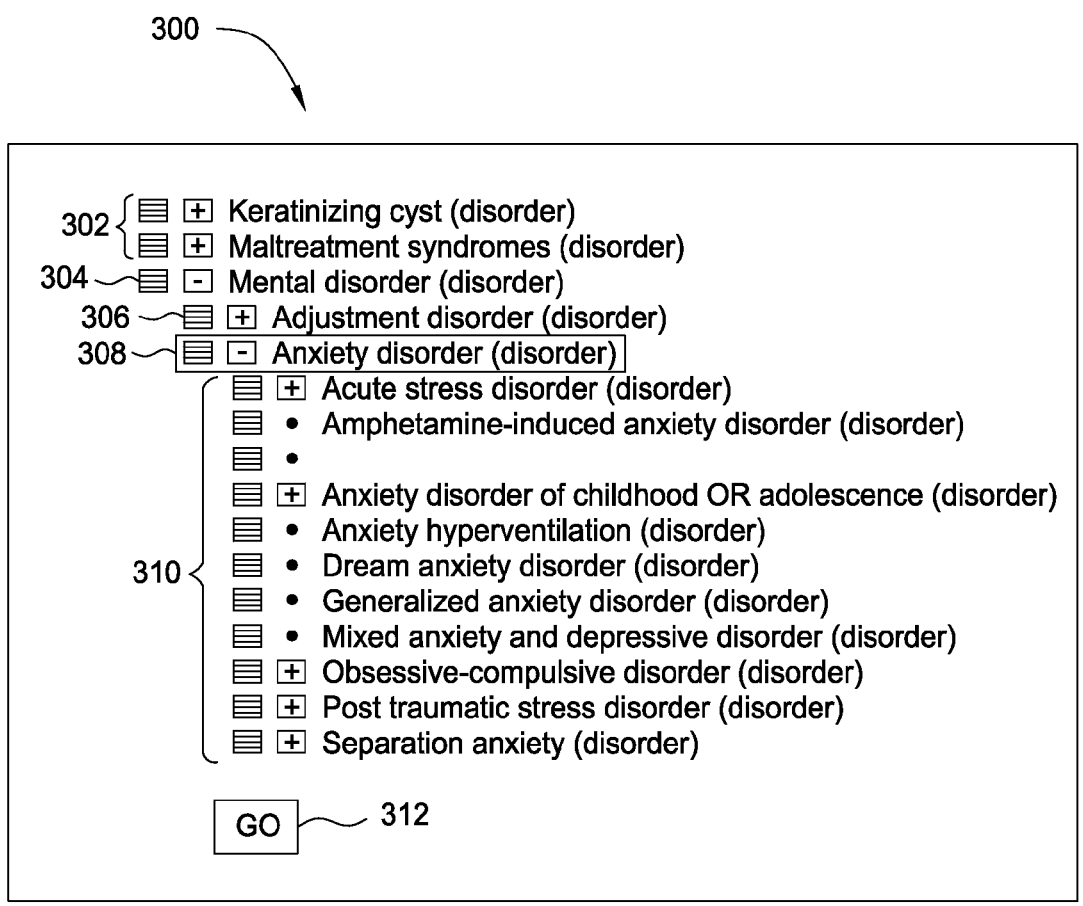
FIG. 3 illustrates an example section of an ontology hierarchy presented to a user in response to an ontology request, according to one embodiment of the invention.

FIG. 3 illustrates an example section 300 of an ontology hierarchy 162 presented to a user in response to an ontology request, according to one embodiment of the invention.

The section 300 of hierarchy 162 "NEUROLOGY-ONT1," includes the category 308, specified in the keyword entry, "ANXIETY DISORDER," along with the terms 310 within category 308.

Because category 308 is a sub-category of category 304, "Mental Disorder," section 300 also includes category 304, the other sub-category 306 of category 304, and the 'neighboring' categories 302 of the category 304.

Additionally, section 300 displays categories in an expandable format. In other words, the "+" symbols to the left of the category labels indicate that further terms exist within a category, and are shown in response to a user clicking the "+" symbol. Similarly, the "−" symbol shown in section 300 indicates that an expanded category can be contracted, so as to hide the terms contained within.

In some embodiments, a user may select one or more categories/sub-categories shown from section 300. According to one embodiment, the user may scroll through neighboring sections of section 300 for selecting other categories/sub-categories.

By viewing an ontology in a hierarchical structure, a user may find categories related to the user's initial keyword entry. By viewing categories related to the initial keyword entry, a user may focus an ontology-based search on a specific sub-category, a related category or a wider array of categories. For example, after viewing section 300, a user could focus a search on one sub-category 310, such as "Anxiety Hyperventilation." A user could also search within a related category, such as "Adjustment Disorder," or broaden the search to, "Mental Disorder," or even search on "Maltreatment syndromes" instead.

When the user has finished selecting search term(s), the user may press the "GO" button 312. In response, the search engine 150 presents search results describing all documents 136 identified in the ontology index 160 that contain the selected term(s), or terms within the sub-categories of the selected term(s). In this example, the user selects category 308, "Anxiety disorder," and presses the "GO" button 312. In response, the search engine presents the list 400 described in FIG. 4.

Figure 4:
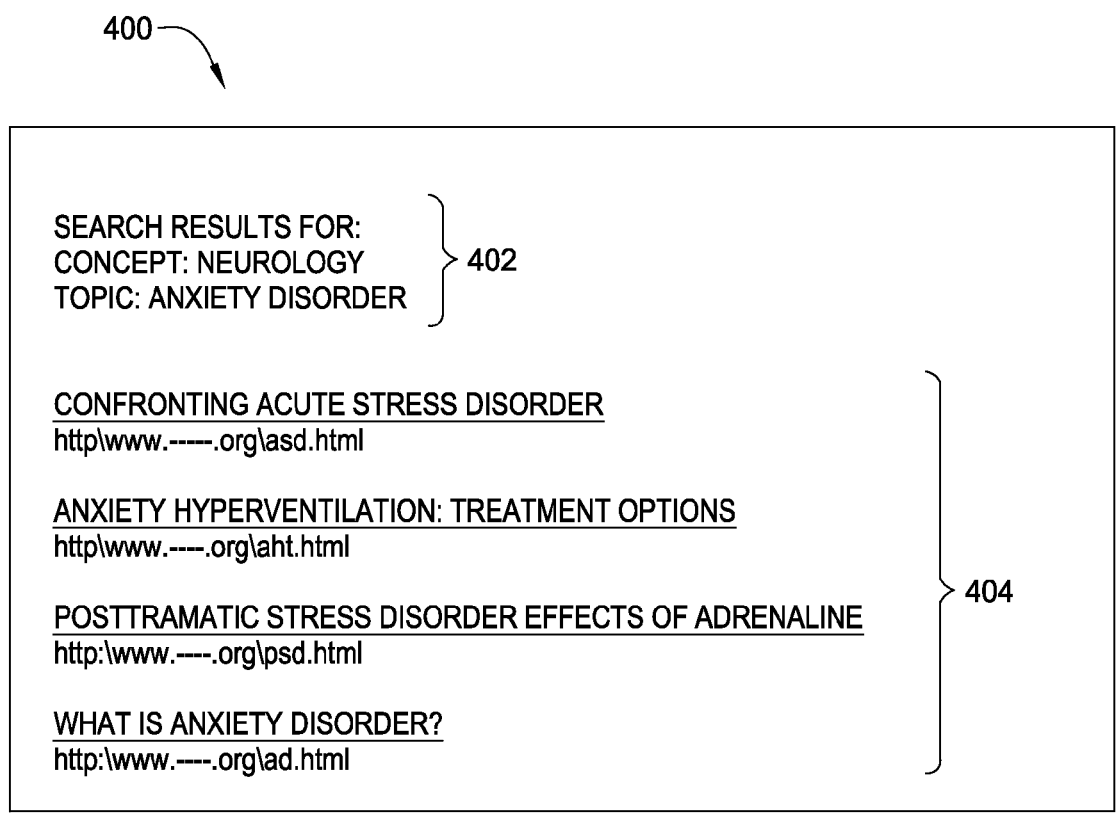
FIG. 4 is an example screen shot presenting search results from an ontology-based search, according to one embodiment of the invention.

FIG. 4 is an example screen shot 400 presenting search results from an ontology-based search, according to one embodiment of the invention. Screen shot 400 includes title 402, and results 404. The title 402 includes a "CONCEPT," which describes the ontology searched, and a "TOPIC," which describes the term(s) that the user selects from the ontology hierarchy 162. In this example, the concept is "NEUROLOGY-ONT1," and the topic is "Anxiety disorder."

According to one embodiment of the invention, the results 404 include document titles and network addresses. FIG. 4 shows http addresses in this example search for Internet documents. However, any network may be searched. Accordingly, the addresses displayed alongside document titles may indicate other types of network addresses. The results indicate documents 136 identified in an ontology index 162, that are associated with the topic, anxiety disorder, and all the sub-categories of anxiety disorder described in FIG. 3.

Figure 5:
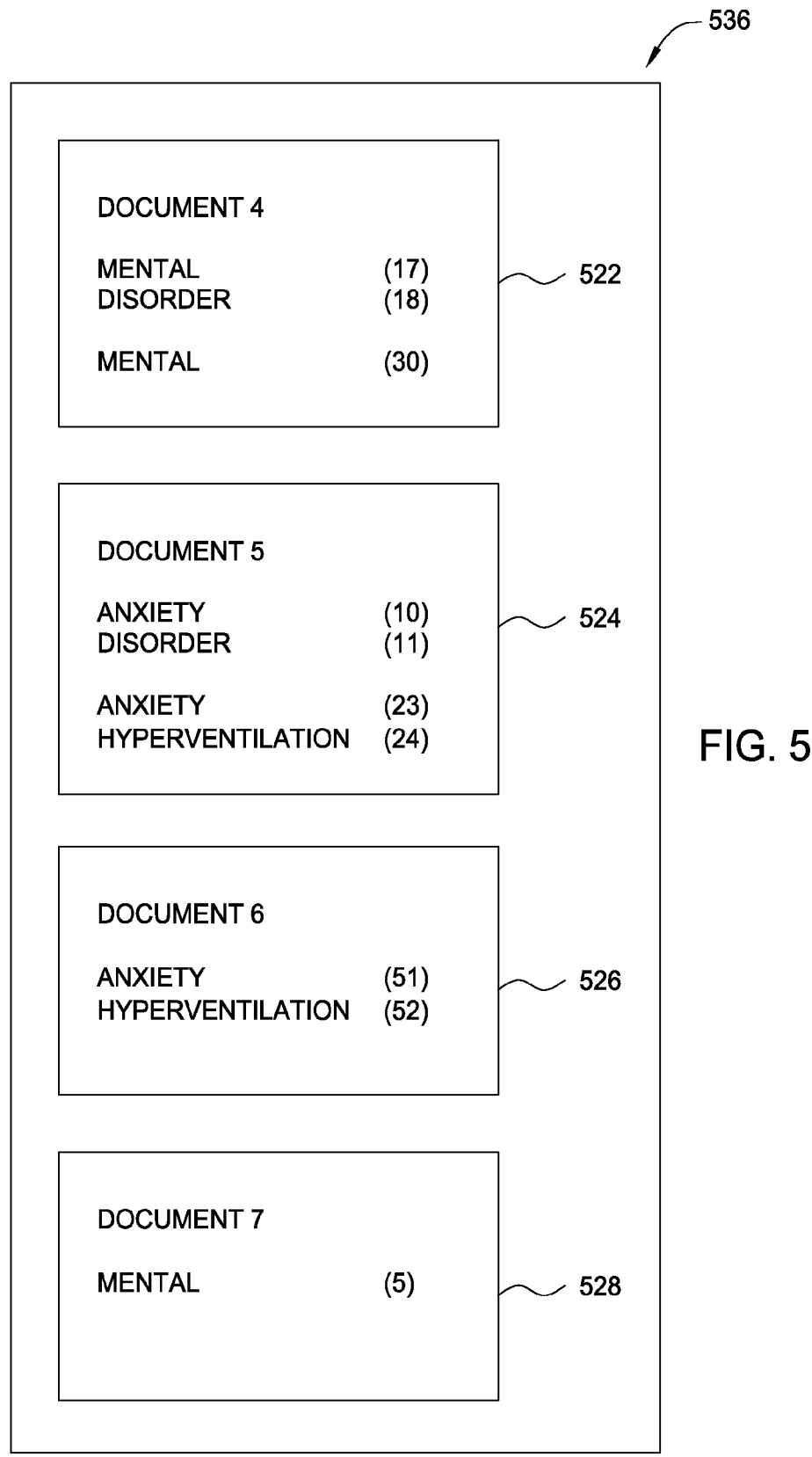
FIG. 5 illustrates four example documents, located on content servers, according to one embodiment of the invention.

FIG. 5 illustrates four example documents 536, located on content servers 122, according to one embodiment of the invention. Documents 536 include, "DOCUMENTS 4-7." Each of the documents 536 shows a small sampling of keywords found in the document, with a notation indicating where the word is positioned in the document. For example, "DOCUMENT 4," contains keywords, "MENTAL," at position 17, and "DISORDER," at position 18. The other documents include similar contents. For purposes of this discussion, the position indicates the word position, or sequence, in the document 536.

FIG. 6A illustrates an example keyword index 656, according to one embodiment of the invention. As described in FIG. 1, the search engine 150 creates a keyword index 156 based on the documents 136 found during a "crawl" of content servers 122 on a network 120. In this example, keyword index 656 is derived from the documents 536, described in FIG. 5.

Keyword index 656 includes a keyword column 602 and a references column 604. Entries in the keyword column 602 indicate keywords found in the documents 536. Entries in the references column 604 indicate the specific documents 536 that contain the keyword, the number of times the keyword appears in the document 536, and the keyword position of each appearance. In this example, the format of the reference is: [number of appearances]: [document id]; [first appearance position . . . nth appearance position].

The first keyword in index 656, "anxiety," has two references. The first reference, "2: 5; 10, 23" indicates that the keyword, "anxiety" appears 2 times in "DOCUMENT 5", at positions 10 and 23. The second reference, "1:6; 51," indicates that the keyword, "anxiety," appears once in "DOCUMENT 6," at position 51.

Keyword index 656 contains other similar entries. The document and position numbers presented herein are merely short-hands used for the sake of clarity. In some embodiments of the invention, a document number may reference another index, wherein the document number is associated with a network address for the document. According to the details of a particular implementation, position number may indicate line number, page number, etc.

FIG. 6B illustrates an example ontology index 660, according to one embodiment of the invention. In this example, ontology index 660 is derived from keyword index 656, and ontology, "NEUROLOGY-ONT1," described in FIG. 3.

According to one embodiment, the ontology index 660 includes a terms column 662 and a references column 664. Entries in the terms column 662 indicate terms from ontology hierarchy 162 found in the documents 536, as indicated by the keyword index 656. Entries in the references column 664 identify the specific documents 536 that contain a term, the number of times the term appears in the document 536, and the position of each appearance. In this example, the format of the reference is: [number of appearances]: [document id]; [first appearance position . . . nth appearance position].

The second term, "Anxiety disorder," in index 656 has two references. The first reference, "2: 5; 10, 23" indicates that the term, "anxiety disorder" appears 2 times in "DOCUMENT 5, ", at position 10 and 23. Referring back to FIG. 5, "DOCUMENT 5" includes the term, "Anxiety disorder," (anxiety at position 10, disorder at position 11), and the term, "Anxiety hyperventilation." Referring back to FIG. 3, section 300 of the ontology hierarchy, "NEUROLOGY-ONT1," includes "Anxiety hyperventilation" as a sub-category of "Anxiety disorder." Accordingly, the appearance of both terms is recorded in the ontology index 660 for the term, "Anxiety disorder."

The second reference for the "Anxiety disorder" term, "2: 5; 10, 23" indicates that the term, "Anxiety disorder" appears once in "DOCUMENT 6", at position 51. Referring back to FIG. 5, "DOCUMENT 6" includes the term, "anxiety hyperventilation," (anxiety at position 51, and hyperventilation at position 52). As discussed previously, "Anxiety hyperventilation" as a sub-category of "Anxiety disorder." Accordingly, the appearance of "Anxiety hyperventilation" is recorded in the ontology index 660 as an appearance of the term, "Anxiety disorder." The ontology index 660 contains other similar entries.

Figure 7:
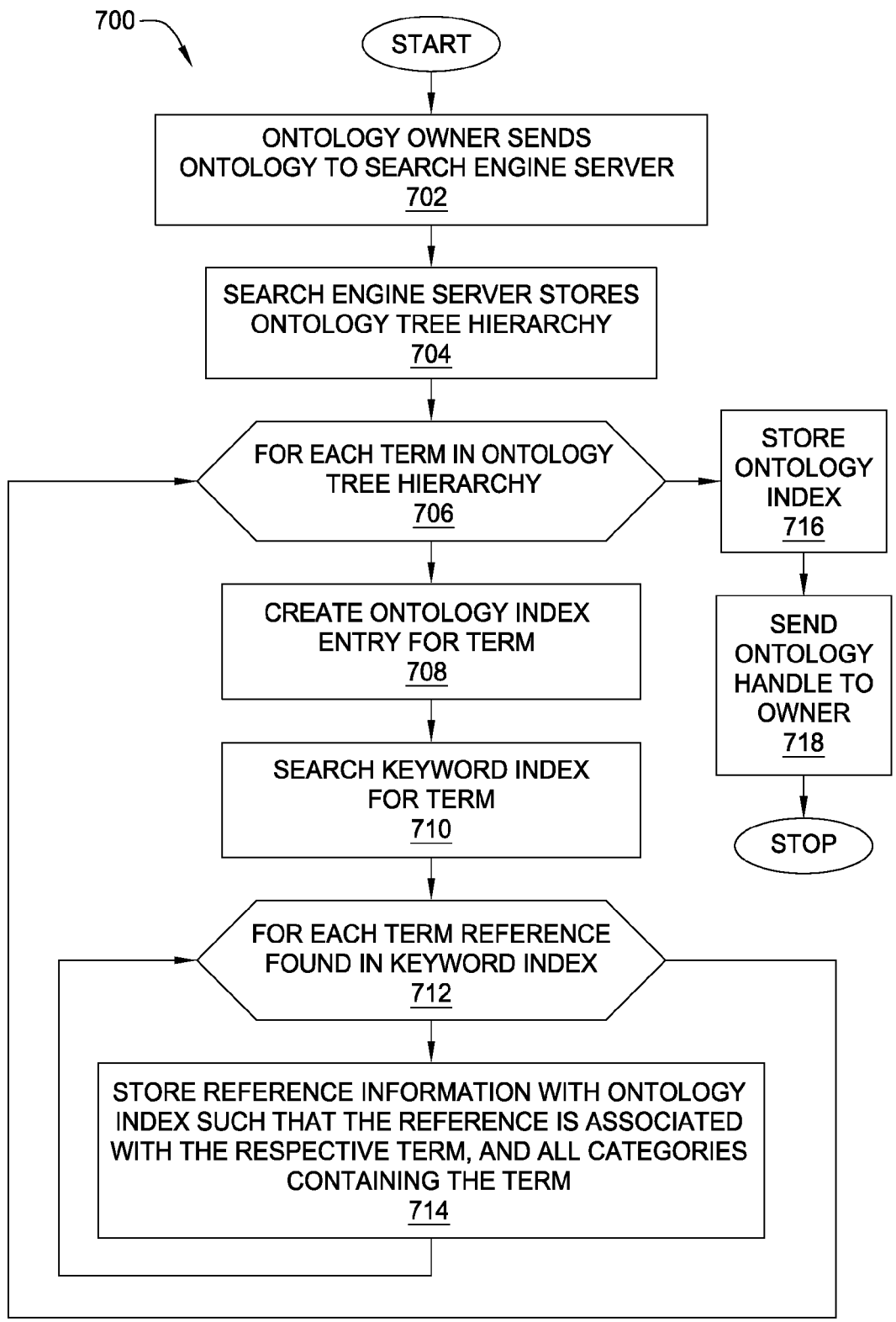
FIG. 7 is a flowchart depicting a process for registering an ontology on a search engine server, according to one embodiment of the invention.

FIG. 7 is a flowchart depicting a process 700 for registering an ontology on a search engine server 142, according to one embodiment of the invention. As shown, process 700 begins at step 702, wherein an ontology owner sends an ontology to a search engine server 142. The ontology may be in the form of a data file, describing the ontology in a tree hierarchy structure, using a standardized format, such as an Ontology Markup Language (OML), or an Ontology Web Language.

At step 704, the search engine server 142 receives the ontology, and stores an ontology tree hierarchy 162. The search engine provider may process the incoming ontology using the search engine 150, or another tool. In some embodiments, the ontology manager 158 processes the incoming ontology to create the tree hierarchy 162.

As is shown, step 706 begins a loop describing the creation of an ontology index 160 that includes steps 708-714. According to one embodiment, the search engine provider may employ a process to creating the ontology index 160 for ontology owners. In such a case, the search engine 150, or another tool defined by the provider, may perform the following functions. For each term contained within an ontology, at step 708, the search engine 150 may create an ontology index 160 entry. The ontology index entry may be in the form of the ontology index entries described in FIG. 6B. At step 710, the search engine 150 may search the keyword index 156 for the term. Searching for a term containing more than one word requires combining references within the keyword index 156 to ensure that all the words of the term appear in one document, consecutively, and in the proper sequence.

As is shown, at step 712, another loop begins including step 714. For each reference found for the term, the search engine 1 50 stores the reference in the ontology index 156 for the term entry. Additionally, the search engine 150 stores the same reference for all the terms/categories in the ontology index 160 that contain the referenced term.

At the conclusion of loop 712, the process 700 continues for the next term in the ontology tree hierarchy 162. At the conclusion of loop 706, the process continues to step 716.

At step 716, the search engine 150 may store the ontology index 160. At step 718, the search engine 150 creates an ontology handle identifying the ontology index, and sends the ontology handle to the ontology owner, completing process 700.

In some embodiments, the ontology manager 158 may create the ontology index 160. In such a case, the ontology manager 158, instead of the search engine 150, may perform the steps 706-716, described above.

Figure 8:
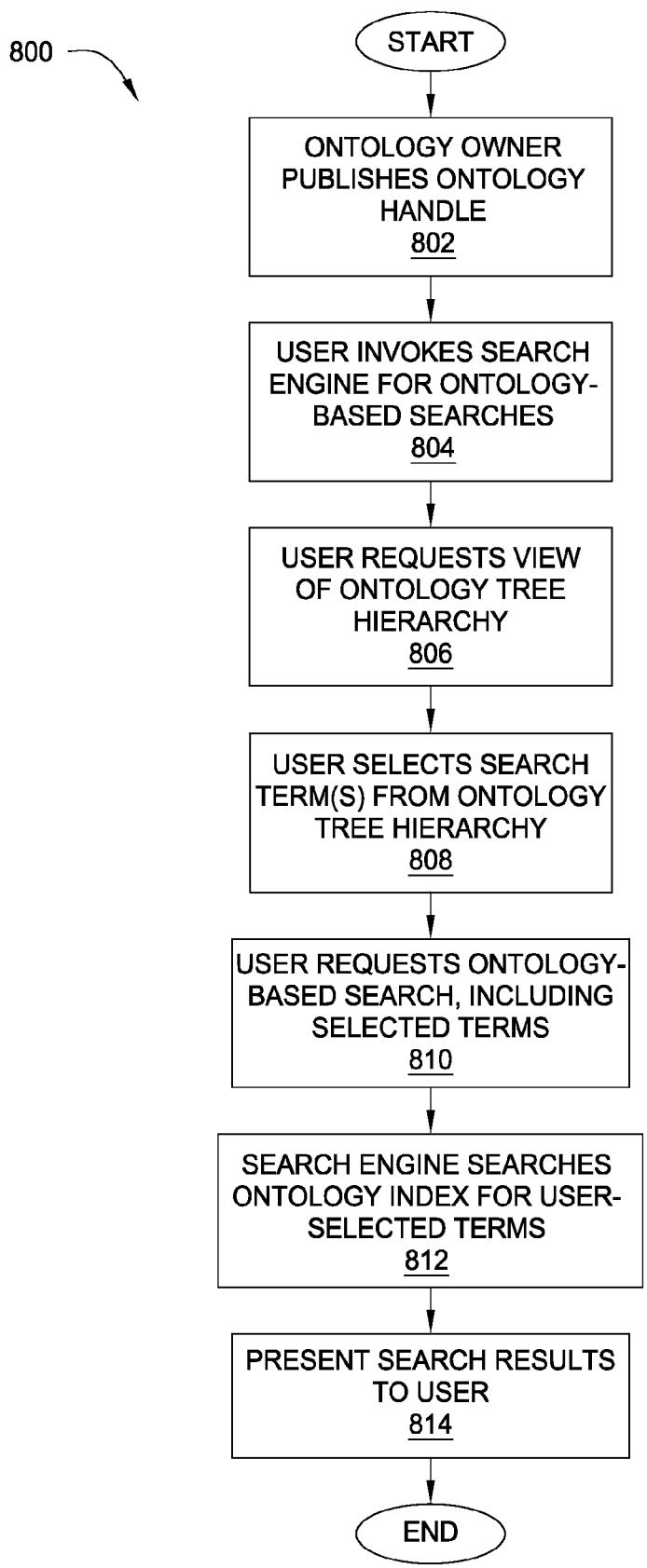
FIG. 8 is a flowchart describing a process for ontology-based network searches, according to one embodiment of the invention.

FIG. 8 is a flowchart describing a process 800 for ontology-based network searches, according to one embodiment of the invention. As shown, process 800 begins at step 802, wherein an ontology owner publishes an ontology handle, either to a restricted group, or publicly.

At step 804, a user invokes a search engine 150 that performs ontology-based searches. A further requirement of the search engine 150 is that the search engine 150 resides on a server 142 that the desired ontology is registered on.

At step 806, the user uses the ontology handle to request a view of the ontology hierarchy 162. In some embodiments, the user may enter one or more keywords such that a specific section of the hierarchy 162, indicated by the keyword(s), is presented to the user.

At step 808, the user sends a request for an ontology-based search to the search engine 150, including one or more terms selected from the hierarchy 162. At step 810, the search engine 150 searches the respective ontology index 160 for the specified ontology hierarchy 162 for references to the user-selected terms.

At step 812, the search engine 150 presents a list to the user, indicating all documents 136 referenced in the ontology index 160 that contain the user-selected term(s). Additionally, for terms that contain terms, or sub-categories, the search engine 150 also includes documents 136 in the list that reference the sub-categories.

In some embodiments, the list may contain a title for each document in the list, and a network address. The particular details of a list entry may vary according to the particular embodiment.

While the foregoing is directed to embodiments of the present invention, other and further embodiments of the invention may be devised without departing from the basic scope thereof, and the scope thereof is determined by the claims that follow.

What is claimed is:

1. A computer-implemented method of registering an ontology with a search engine provider, comprising:
   receiving an ontology definition comprising a plurality of terms from an ontology owner; and
   creating an ontology index based on the ontology definition and a keyword index, wherein the keyword index includes a plurality of relationships between a plurality of keywords and a plurality of documents residing on a network, and wherein the ontology index includes a plurality of relationships between the plurality of terms and the plurality of documents residing on the network, comprising:
      creating a plurality of ontology index entries, wherein each of the plurality of ontology index entries corresponds to a respective one of the plurality of terms in the ontology definition; and
      for each of the plurality of ontology index entries:
         searching the keyword index for the corresponding one of the plurality of terms to identify one or more related documents; and
         inserting an identifier of the identified one or more related documents into the ontology index entry.

2. The method of claim 1, further comprising:
   providing an interface to a search engine server of the search engine provider, wherein a user may specify search terms for searching the ontology index.

3. The method of claim 2, further comprising:
   receiving a search request, comprising one or more search terms of the ontology;
   identifying one or more documents residing on the network based on the one or more search terms, the ontology, and the ontology index; and
   presenting one or more search results that describe the one or more documents to the user, wherein the one or more documents contain the one or more search terms, or a sub-category term of the one or more search terms.

4. The method of claim 1, further comprising:
   generating an ontology handle, wherein an ontology handle enables a user to view the ontology definition and search the ontology index;
   sending the ontology handle to the ontology owner.

5. The method of claim 1, further comprising:
   providing an interface to a search engine server of the search engine provider, wherein a user may specify search terms for searching the ontology.

6. The method of claim 5, wherein the interface further comprises a drop-down selectable list of a plurality of publicly available ontologies.

7. A computer-readable storage medium containing a program which, when executed, performs an operation, comprising:
   receiving an ontology definition comprising a plurality of terms from an ontology owner; and
   creating an ontology index based on the ontology definition and a keyword index, wherein the keyword index includes a plurality of relationships between a plurality of keywords and a plurality of documents residing on a network, and wherein the ontology index includes a plurality of relationships between the plurality of terms and the plurality of documents residing on the network, comprising:
      creating a plurality of ontology index entries, wherein each of the plurality of ontology index entries corresponds to a respective one of the plurality of terms in the ontology definition; and
      for each of the plurality of ontology index entries:
         searching the keyword index for the corresponding one of the plurality of terms to identify one or more related documents; and
         inserting an identifier of the identified one or more related documents into the ontology index entry.

8. The computer-readable storage medium of claim 7, further comprising:
   providing an interface to a search engine server of the search engine provider, wherein a user may specify search terms for searching the ontology index.

9. The computer-readable storage medium of claim 8, further comprising:
   receiving a search request, comprising one or more search terms of the ontology;
   identifying one or more documents residing on the network based on the one or more search terms, the ontology, and the ontology index; and
   presenting one or more search results that describe the one or more documents to the user, wherein the one or more documents contain the one or more search terms, or a sub-category term of the one or more search terms.

10. The computer-readable storage medium of claim 7, further comprising:
    generating an ontology handle, wherein an ontology handle enables a user to view the ontology definition and search the ontology index;
    sending the ontology handle to the ontology owner.

11. The computer-readable storage medium of claim 7, further comprising:
    providing an interface to a search engine server of the search engine provider, wherein a user may specify search terms for searching the ontology.

12. The computer-readable storage medium of claim 11, wherein the interface further comprises a drop-down selectable list of a plurality of publicly available ontologies.

13. A system, comprising:
a processor;
a memory containing a program configured to register an ontology with a search engine provider, the program, when executed on the processor, performs an operation, comprising:
 receiving an ontology definition comprising a plurality of terms from an ontology owner; and
 creating an ontology index based on the ontology definition and a keyword index, wherein the keyword index includes a plurality of relationships between a plurality of keywords and a plurality of documents residing on a network, and wherein the ontology index includes a plurality of relationships between the plurality of terms and the plurality of documents residing on the network, comprising:
  creating a plurality of ontology index entries, wherein each of the plurality of ontology index entries corresponds to a respective one of the plurality of terms in the ontology definition; and
  for each of the plurality of ontology index entries:
   searching the keyword index for the corresponding one of the plurality of terms to identify one or more related documents; and
   inserting an identifier of the identified one or more related documents into the ontology index entry.

14. The system of claim 13, further comprising:
providing an interface to a search engine server of the search engine provider, wherein a user may specify search terms for searching the ontology index.

15. The system of claim 13, further comprising:
generating an ontology handle, wherein an ontology handle enables a user to view the ontology definition and search the ontology index;
sending the ontology handle to the ontology owner.

16. The system of claim 13, further comprising:
providing an interface to a search engine server of the search engine provider, wherein a user may specify search terms for searching the ontology.

17. The system of claim 16, wherein the interface further comprises a drop-down selectable list of a plurality of publicly available ontologies.

18. The method of claim 1, wherein searching the keyword index for the corresponding one of the plurality of terms to identify one or more related documents further comprises:
 determining that the corresponding one of the plurality of terms contains a plurality of words; and
 searching the keyword index to determine that all of the plurality of words appear in each of the identified one or more related documents consecutively and in sequence.

19. The computer-readable storage medium of claim 7, wherein searching the keyword index for the corresponding one of the plurality of terms to identify one or more related documents further comprises:
 determining that the corresponding one of the plurality of terms contains a plurality of words; and
 searching the keyword index to determine that all of the plurality of words appear in each of the identified one or more related documents consecutively and in sequence.

20. The system of claim 13, wherein searching the keyword index for the corresponding one of the plurality of terms to identify one or more related documents further comprises:
 determining that the corresponding one of the plurality of terms contains a plurality of words; and
 searching the keyword index to determine that all of the plurality of words appear in each of the identified one or more related documents consecutively and in sequence.

* * * * *